(12) United States Patent
Lukic et al.

(10) Patent No.: US 9,904,319 B2
(45) Date of Patent: Feb. 27, 2018

(54) TABLET

(71) Applicant: ASUSTEK COMPUTER INC., Taipei (TW)

(72) Inventors: Igor Lukic, Taipei (TW); Yaw-Huei Chiou, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/589,236

(22) Filed: May 8, 2017

(65) Prior Publication Data

US 2017/0336827 A1 Nov. 23, 2017

Related U.S. Application Data

(60) Provisional application No. 62/337,679, filed on May 17, 2016.

(30) Foreign Application Priority Data

Dec. 30, 2016 (CN) .......................... 2016 2 1489888

(51) Int. Cl.
*G06F 1/16* (2006.01)
*A63F 13/2145* (2014.01)

(52) U.S. Cl.
CPC ........ *G06F 1/1626* (2013.01); *A63F 13/2145* (2014.09); *G06F 1/166* (2013.01); *G06F 1/1633* (2013.01); *G06F 2200/1632* (2013.01)

(58) Field of Classification Search
CPC .......................... G06F 1/166; G06F 2200/1632
See application file for complete search history.

(56) References Cited

U.S. PATENT DOCUMENTS

| | | | | |
|---|---|---|---|---|
| 4,158,197 A * | 6/1979 | Takagaki | ............. | G08B 15/004 340/514 |
| 4,940,204 A * | 7/1990 | Nelson | ................... | F16M 11/10 248/455 |
| 5,037,224 A * | 8/1991 | Wright | ................... | B43K 23/04 15/437 |
| 5,657,459 A * | 8/1997 | Yanagisawa | .......... | G06F 1/1632 345/169 |
| 6,053,589 A * | 4/2000 | Lin | ........................ | G06F 1/1616 312/271 |
| 6,097,595 A * | 8/2000 | Cipolla | ................. | G06F 1/1616 248/685 |
| 6,246,577 B1 * | 6/2001 | Han | ....................... | G06F 1/1632 345/179 |

(Continued)

*Primary Examiner* — Adrian S Wilson

(74) *Attorney, Agent, or Firm* — Muncy, Geissler, Olds & Lowe, P.C.

(57) ABSTRACT

A tablet adapted to be combined with a rod holder is provided. The tablet comprises a device body with a first surface and a second surface. The device body includes a first side edge, a second side edge adjacent to the first side edge, and a support area located at a joint of the first side edge and the second side edge. A through hole extending through the first surface and the second surface is formed at the support area. When the rod holder is inserted through the through hole to be combined with the device body, an end of the rod holder abuts against a supporting surface, and a support angle is formed between the device body and the supporting surface via the other end of the rod holder.

8 Claims, 12 Drawing Sheets

(56) References Cited

U.S. PATENT DOCUMENTS

| | | | | |
|---|---|---|---|---|
| 6,924,791 B1* | 8/2005 | Nicolas | G06F 1/1626 | 178/18.01 |
| 7,138,977 B2* | 11/2006 | Kinerk | G06F 1/1626 | 345/156 |
| 7,267,504 B2* | 9/2007 | Brooks | B43K 23/001 | 401/131 |
| 7,425,948 B2* | 9/2008 | Ling | G06F 1/1626 | 248/688 |
| 7,451,917 B2* | 11/2008 | McCall | G06Q 20/00 | 235/379 |
| 7,472,825 B2* | 1/2009 | Fitch | G07G 1/0018 | 235/379 |
| 7,623,121 B2* | 11/2009 | Dodge | G06F 3/039 | 345/179 |
| 7,810,768 B2* | 10/2010 | Wang | F16M 11/10 | 248/176.3 |
| 7,898,802 B2* | 3/2011 | Lian | G06F 1/1616 | 108/50.01 |
| 8,054,613 B2* | 11/2011 | Hsu | G06F 1/1601 | 345/179 |
| 8,164,584 B2* | 4/2012 | Lin | G06F 1/1626 | 178/19.01 |
| 8,255,015 B2* | 8/2012 | Wang | G06F 1/1626 | 455/575.1 |
| 8,508,938 B2* | 8/2013 | Luo | G06F 1/203 | 345/156 |
| 8,724,319 B2* | 5/2014 | Shih | F16M 11/10 | 361/679.05 |
| 8,867,201 B2* | 10/2014 | Lin | H04M 1/21 | 361/679.04 |
| 8,922,996 B2* | 12/2014 | Yeh | H04M 1/0202 | 361/679.3 |
| 9,047,058 B2* | 6/2015 | Yu | G06F 1/1681 | |
| 9,545,147 B2* | 1/2017 | Sadai | H04B 1/3888 | |
| 2004/0121798 A1* | 6/2004 | Hamasaki | A45F 5/00 | 455/550.1 |
| 2004/0135765 A1* | 7/2004 | Kinerk | G06F 1/1626 | 345/156 |
| 2005/0274786 A1* | 12/2005 | Hwang | G06F 1/1624 | 235/145 R |
| 2005/0275623 A1* | 12/2005 | Chadha | G06F 3/0312 | 345/156 |
| 2006/0044288 A1* | 3/2006 | Nakamura | G06F 1/1626 | 345/179 |
| 2006/0050471 A1* | 3/2006 | Chen | G06F 1/1601 | 361/679.22 |
| 2009/0321609 A1* | 12/2009 | Wang | G06F 1/1626 | 248/685 |
| 2010/0284146 A1* | 11/2010 | Hsu | G06F 1/166 | 361/679.59 |
| 2011/0228455 A1* | 9/2011 | Dong | H04M 1/05 | 361/679.01 |
| 2012/0013781 A1* | 1/2012 | Yamagiwa | G06F 1/1626 | 348/333.01 |
| 2012/0106054 A1* | 5/2012 | Royz | F16M 11/10 | 361/679.3 |
| 2012/0218699 A1* | 8/2012 | Leung | G06F 1/1616 | 361/679.08 |
| 2013/0181098 A1* | 7/2013 | Lin | F16M 11/105 | 248/122.1 |
| 2016/0230924 A1* | 8/2016 | Chen | F16M 13/005 | |

* cited by examiner

TABLET

CROSS-REFERENCE TO RELATED APPLICATION

This application claims the priority benefit of U.S. provisional application Ser. No. 62/337,679, filed on May 17, 2016 and China application serial No. 201621489888.0, filed on Dec. 30, 2016. The entirety of the above-mentioned patent applications are hereby incorporated by references herein and made a part of specification.

BACKGROUND OF THE INVENTION

1. Field of the Invention

The disclosure relates to an electronic device and, more specifically, to a tablet.

2. Description of the Prior Art

In recent years, with the rapid development of touch-control electronic devices, the touch-control electronic devices, such as smartphones and tablet computer, become popular in people's daily life. Touch-control electronic devices are used to watch movies, communicate, play games or search. In some cases, the touch-control electronic device is preferably placed on a support for relieving fatigue.

Conventionally, a foldable protective cover, a bracket or a support base is usually used as a support for a tablet computer. However, the support base or the protective cover is not a part of the hand-held electronic device, and thus it's easy to forget to carry them.

BRIEF SUMMARY OF THE INVENTION

According to an aspect of the disclosure, a tablet adapted to be combined with a rod holder is provided. The tablet comprises a device body with a first surface and a second surface. The device body includes a first side edge, a second side edge adjacent to the first side edge, and a support area located at a joint of the first side edge and the second side edge. A through hole extending through the first surface and the second surface is formed at the support area. The through hole extends along an inclined direction to be inclined via the first surface. When the rod holder is inserted through the through hole to be combined with the device body, an end of the rod holder abuts against a supporting surface, and a support angle is formed between the device body and the supporting surface via the other end of the rod holder.

In sum, the tablet includes a through hole at the support area of the device body. The rod holder is inserted through the through hole to abut against the supporting surface to bear the weight of the device body. Thus, the device body can stand on the supporting surface stably.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

These and other features, aspects, and advantages of the disclosure will become better understood with regard to the following description, appended claims, and accompanying drawings. However, the figures are shown only for better illustration of the disclosure, in which the components are simplified and not represented in their actual size.

Figure 1:
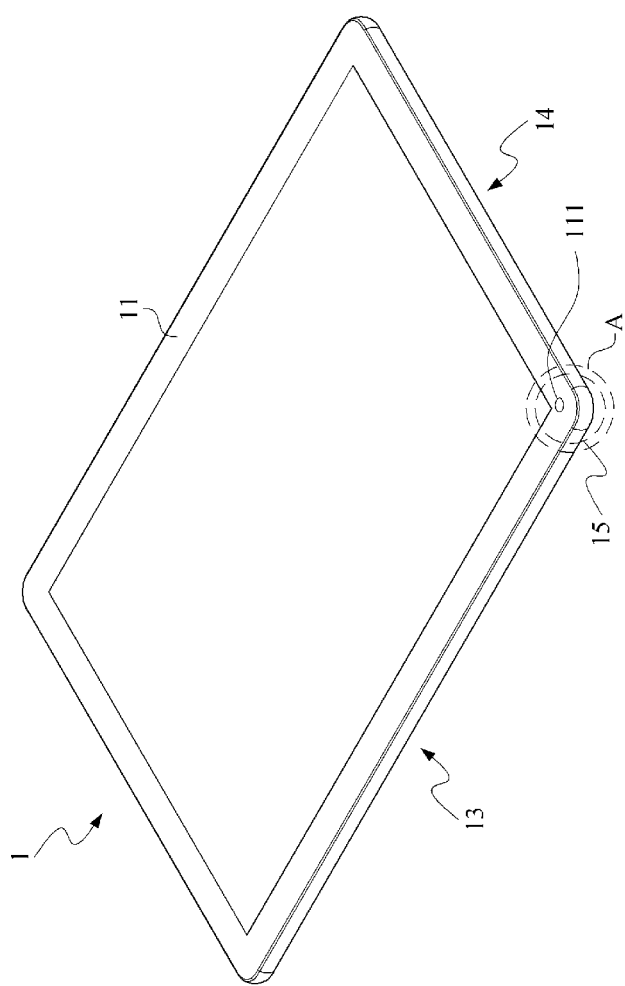
FIG. 1 is a perspective view of a device body of a tablet in an embodiment.
Figure 2:
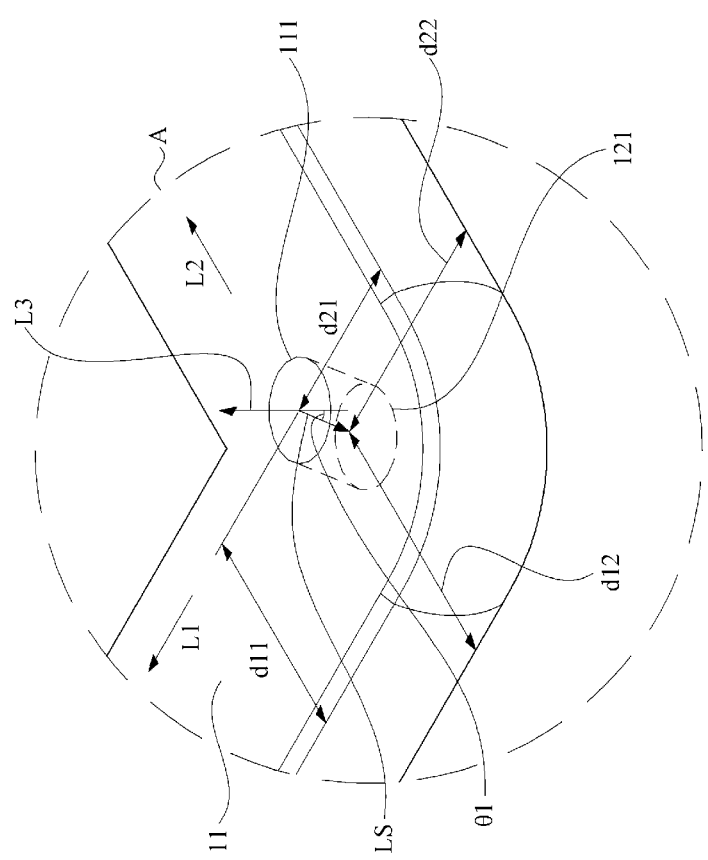
FIG. 2 is a partially enlarged view of a circle A in FIG. 1 in an embodiment.

Please refer to FIG. 1 and FIG. 2. FIG. 1 is a perspective view of a device body of a tablet in an embodiment. FIG. 2 is a partially enlarged view of a circle A in FIG. 1 in an embodiment. As shown in the figures, a tablet 100 is adapted to be combined with a rod holder 2. The tablet 100 includes a device body 1. The device body 1 includes a first surface 11 and a second surface 12 (which is denoted in FIG. 4) opposite to the first surface 11. The device body 1 includes a first side edge 13, a second side edge 14 and a support area 15. In the embodiment, the device body 1 is a tablet computer. In an embodiment, the device body 1 is a smart phone, which is not limited herein.

The first side edge 13 is adjacent to the second side edge 14. The support area 15 is located at a joint of the first side edge 13 and the second side edge 14. The first side edge 13 extends along a length direction L1. The second side edge 14 extends along a width direction L2 (which is perpendicular to the length direction L1). The first surface 11 includes a first opening 111 at the support area 15. The second surface 12 includes a second opening 121 at the support area 15.

Figure 4:
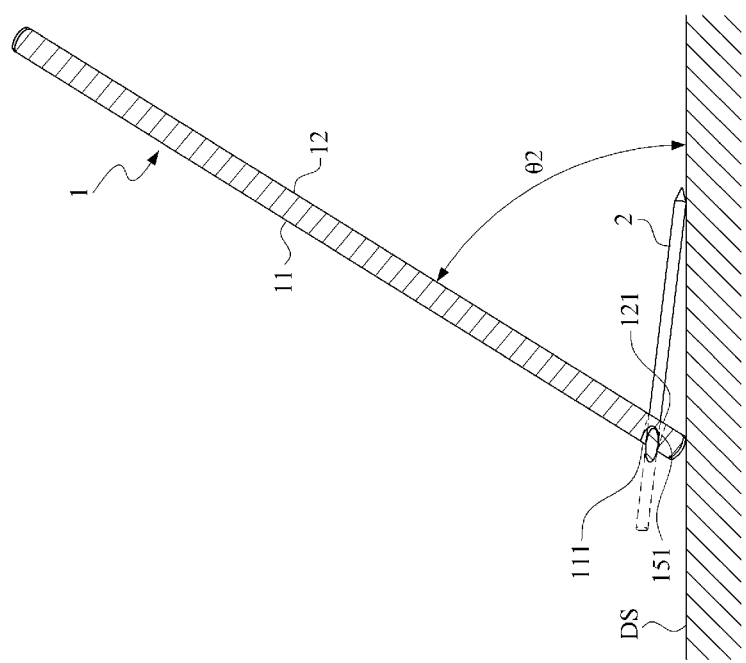
FIG. 4 is a section view of the tablet along a line B-B in FIG. 3 in an embodiment.

Please refer to FIG. 4. The support area 15 includes a through hole 151 extending through the first surface 11 and the second surface 12. The through hole 151 extends from the first opening 111 (which is adjacent to the joint of the first side edge 13 and the second side edge 14) to the second opening 121 (which is away from the joint of the first side edge 13 and the second side edge 14) along an inclined direction LS (which is inclined to the first surface 11 and the second surface 12). The inclined direction LS refers to a direction that is not parallel and not perpendicular to the first surface 11 and the second surface 12. The inclined direction LS is not parallel and not perpendicular to the length direction L1 or the width direction L2 (which is parallel to the first surface 11 and the second surface 12). Additionally, the inclined direction LS refers to the direction that is not parallel and not perpendicular to a thickness direction (which is perpendicular to the length direction L1 and the width direction L2, and which also can be regarded as the normal direction of the first surface 11). An angle θ1 is formed between the inclined direction LS and the thickness direction L3. In an embodiment, the inclined direction LS is not parallel and not perpendicular to the thickness direction L3. The inclined direction LS is perpendicular to, but not parallel to one of the length direction L1 and the width direction L2, which is not limited herein.

In an embodiment, a first front distance d11 is formed between the center of the first opening 111 and the first side edge 13. A first back distance d12 is formed between the center of the second opening 121 and the first side edge 13. The first back distance d12 is larger than the first front distance d11. A second front distance d21 is formed between the center of the first opening 111 and the second side edge 14. A second back distance d22 is formed between the center of the second opening 121 and the second side edge 14. The second back distance d22 is larger than the second front distance d21. In other words, the first opening 111 is closer to the joint of the first side edge 13 and the second side edge 14 relative to that of the second opening 121. The second opening 121 is closer to the center of the device body 1 relative to the first opening 111.

Figure 3:
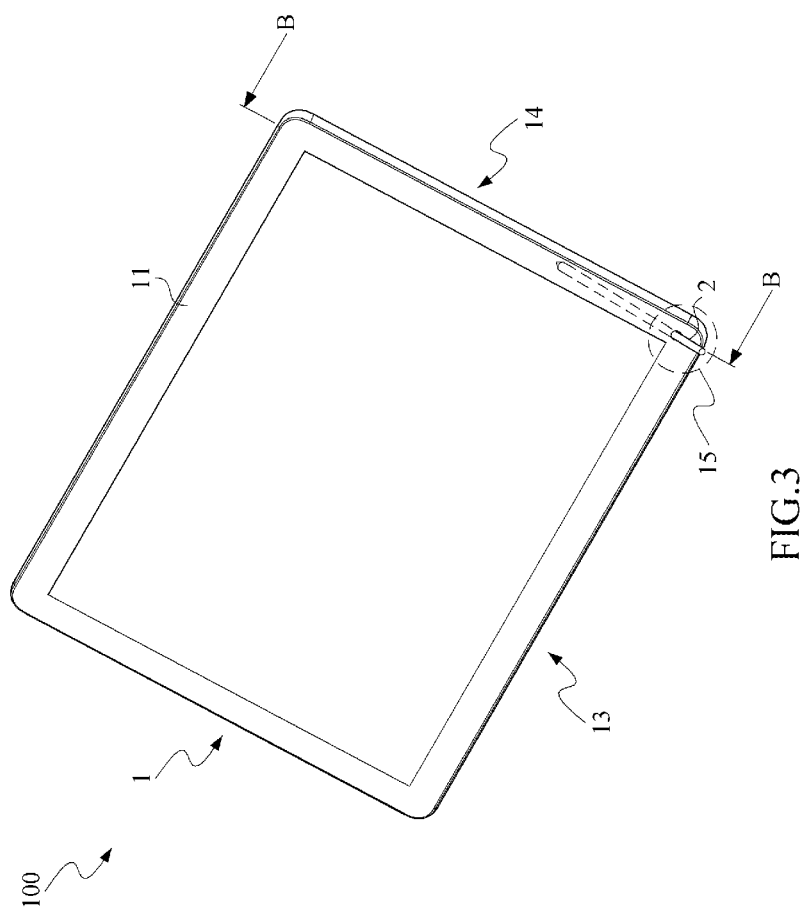
FIG. 3 is a perspective view of the tablet in FIG. 1 that stands via a first side edge in an embodiment.

Please refer to FIG. 3 and FIG. 4. FIG. 3 is a perspective view of the tablet in FIG. 1 that stands via a first side edge in an embodiment. FIG. 4 is a section view of the tablet along a line B-B in FIG. 3 in an embodiment. As shown in the figures, the tablet 100 is adapted to be combined with the rod holder 2. The rod holder 2 is inserted through the through hole 151. In the embodiment, the rod holder 2 is a stylus. The diameter of the rod holder 2 is less than the diameter of the through hole 151.

In an embodiment, when the first side edge 13 is placed against a supporting surface DS and the second surface 12 is inclined toward the supporting surface DS, the rod holder 2 is inserted through the through hole 151 to abut against the supporting surface DS and bear the weight of the device body 1. Thus, the device body 1 is supported by the supporting surface DS via both the rod holder 2 and the first side edge 13. The device body 1 stands on the supporting surface DS, and a support angle θ2 is kept between the device body 1 and the supporting DS via the rod holder 2. In an embodiment, when the length of the rod holder 2 is longer, the device body 1 is supported more stably.

Figure 5:
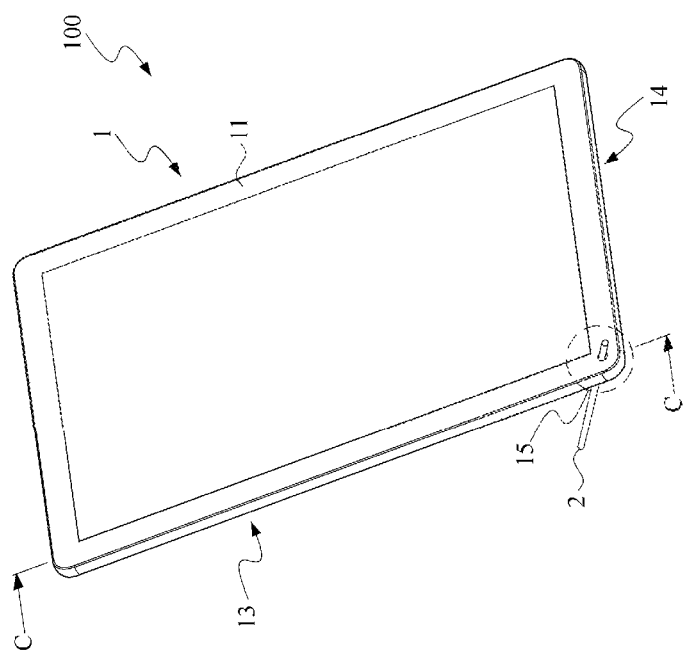
FIG. 5 is a perspective view of the tablet in FIG. 1 that stands via a second side edge in an embodiment.
Figure 6:
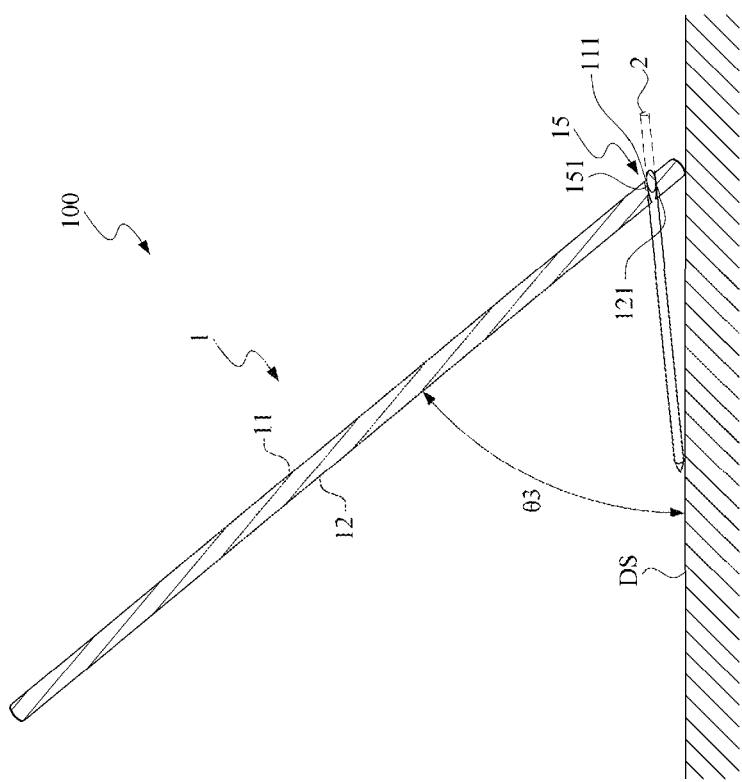
FIG. 6 is a section view of the tablet along a line C-C in FIG. 5 in an embodiment.

Please refer to FIG. 5 and FIG. 6. FIG. 5 is a perspective view of the tablet in FIG. 1 that stands via a second side edge in an embodiment. FIG. 6 is a section view of the tablet along a line C-C in FIG. 5 in an embodiment. As shown in the figures, when the second side edge 14 is placed against the supporting surface DS and the second surface 12 is inclined toward the supporting surface DS, the rod holder 2 is inserted through the through hole 151 to abut against the supporting surface DS to bear the weight of the device body 1. Thus, the device body 1 is supported by the supporting surface DS via both the rod holder 2 and the second side edge 14. The device body 1 stands on the supporting surface DS, and a support angle θ3 is kept between the device body 1 and the supporting DS via the rod holder 2.

Figure 7:
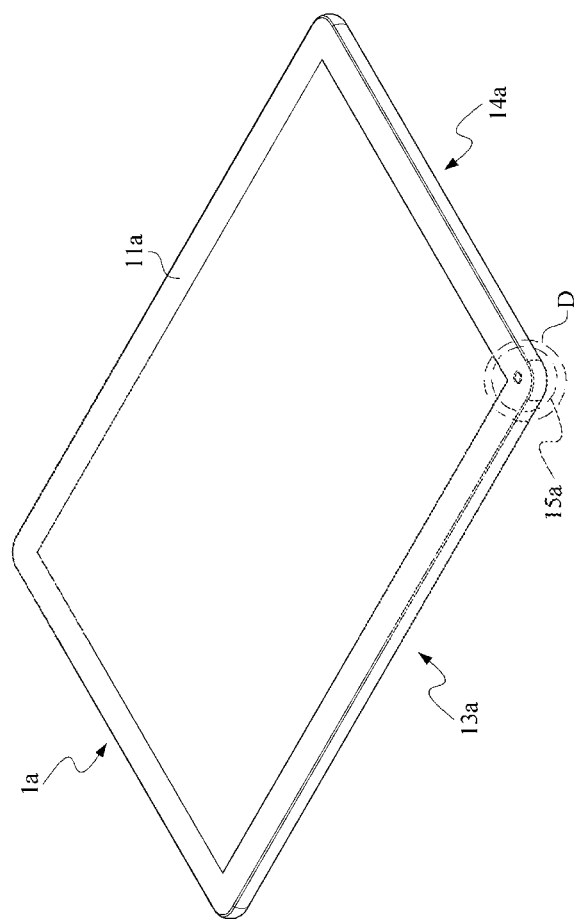
FIG. 7 is a perspective view of a device body of a tablet in an embodiment.
Figure 8:
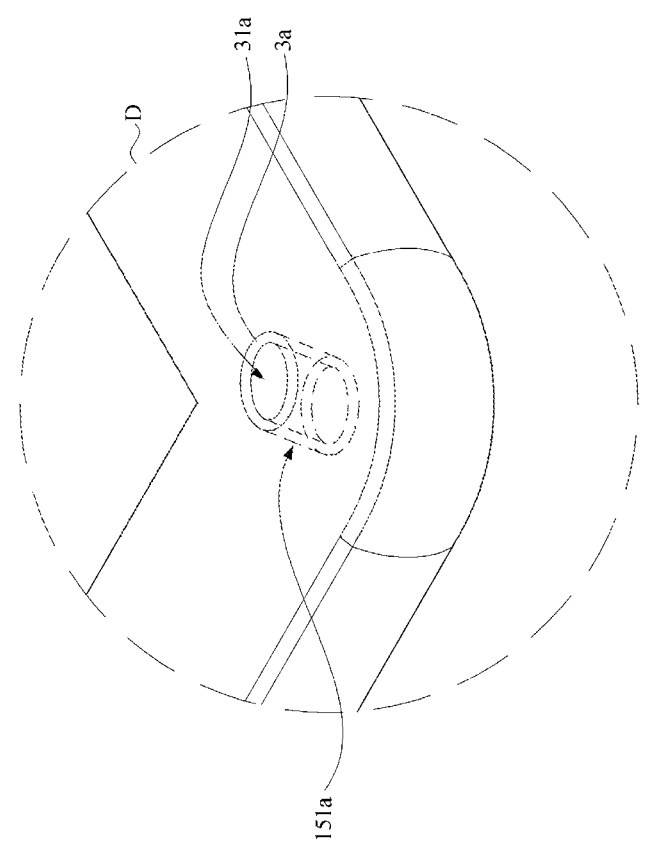
FIG. 8 is a partially enlarged view of a circle D in FIG. 7 in an embodiment.

Please refer to FIG. 7 and FIG. 8. FIG. 7 is a perspective view of a device body of a tablet in an embodiment. FIG. 8 is a partially enlarged view of a circle D in FIG. 7 in an embodiment. As shown in the figures, a device body 1*a* includes the first surface 11*a* and a second surface (not shown in the figures, and which corresponds to the second surface 12) opposite to the first surface 11*a*. The device body 1*a* includes a first side edge 13*a*, a second side edge 14*a* and a support area 15*a*.

In the embodiment, the device body 1*a* is similar to the device body 1. The difference between the device body 1*a* and the device body 1 is that a rubber ring 3*a* is disposed within a through hole 151*a* of a support area 15*a*. The rubber ring 3*a* includes a non-slip through hole 31*a*. Similar to the embodiment in FIG. 3, the rod holder 2 is inserted through the non-slip through hole 31*a* to support the device body 1*a*. In an embodiment, of the rubber ring 3*a* includes high friction coefficient to prevent the rod holder 2 from sliding in the through hole 151. As a result, the device body 1*a* is stably supported.

Figure 9:
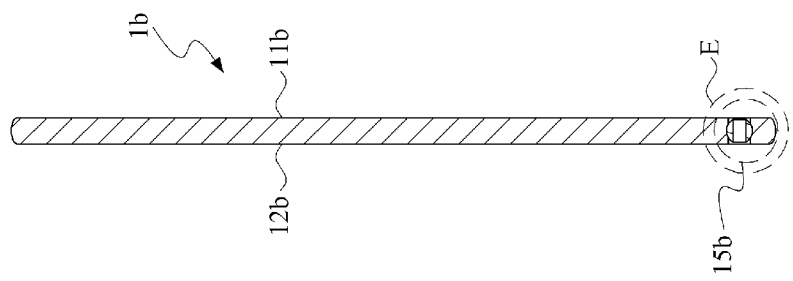
FIG. 9 is a section view of a device body of a tablet in an embodiment.
Figure 10:
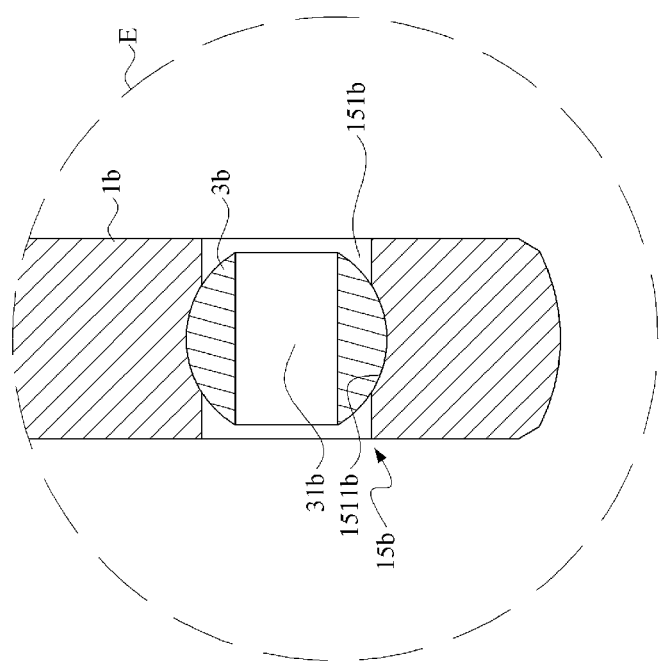
FIG. 10 is a partially enlarged view of a circle E in FIG. 9 in an embodiment.

Please refer to FIG. 9 and FIG. 10. FIG. 9 is a section view of a device body of a tablet in an embodiment. FIG. 10 is a partially enlarged view of a circle E in FIG. 9 in an embodiment. As shown in the figures, a device body 1*b* is provided in an embodiment. The device body 1*b* is similar to the device body 1 in FIG. 1. Similarly, the device body 1*b* includes a through hole 151*b* at a support area 15*b* and the through hole 151*b* extends through a first surface 11*b* and a second surface 12*b*. In the embodiment, the through hole 151*b* further includes an annular recessed wall 1511*b*. A universal ball 3*b* is multi-axially pivotable within the through hole 151*b*. The universal ball 3*b* is matched with the annular recessed wall 1511*b* to be held by the annular recessed wall 1511*b*. The universal ball 3*b* includes a universal ball through hole 31*b*. The rod holder 2 is inserted through the universal ball through hole 31*b*.

Figure 11:
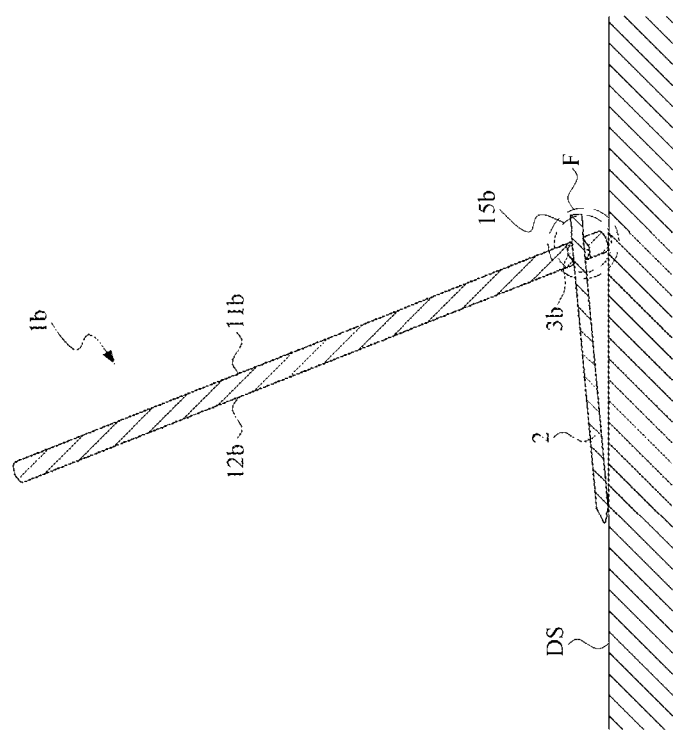
FIG. 11 is a section view showing that a rod holder is inserted through a universal ball through hole in an embodiment.
Figure 12:
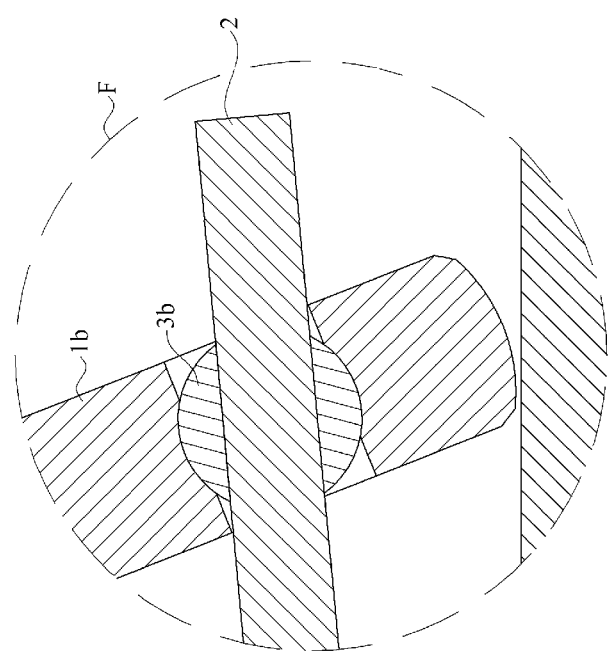
FIG. 12 is a partially enlarged view of a circle F in FIG. 9 in an embodiment.

Please refer to FIG. 11 and FIG. 12. FIG. 11 is a section view showing that a rod holder is inserted through a universal ball through hole in an embodiment. FIG. 12 is a partially enlarged view of a circle F in FIG. 9 in an embodiment. As shown in the figures, after the rod holder 2 is inserted through the universal ball through hole 31*b*, the rod holder 2 is multi-axially rotatable relative to the device body 1*b*. When the rod holder 2 abuts against the supporting surface DS and the edge of the through hole 151*b*, the device body 1*b* stands on the supporting surface DS.

In sum, the tablet includes a through hole at the support area of the device body. With such a configuration, the device body can stand on the supporting surface via the cooperation of the through hole and the rod holder. The structure of the rod holder is simple. It's easy for the user to carry and most of pens can be served as the rod holder. Even a chopstick can also be served as the rod holder to support the device body, which is convenient.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A tablet, adapted to be combined with a rod holder, comprising:
   a device body with a first surface and a second surface, the device body including:
     a first side edge;
     a second side edge, adjacent to the first side edge; and
     a support area, located at a joint of the first side edge and the second side edge, a through hole extending through the first surface and the second surface is formed at the support area, and the through hole extends along an inclined direction to be inclined via the first surface;
   wherein when the rod holder is inserted through the through hole of the device body, an end of the rod holder abuts against a supporting surface, and a support angle is formed between the device body and the supporting surface via the other end of the rod holder.

2. The tablet according to claim 1, wherein the first surface includes a first opening, the second surface includes a second opening, the through hole is formed along the inclined direction from the first opening to the second opening.

3. The tablet according to claim 2, wherein a first front distance is formed between the first side edge and the center of the first opening, a first back distance is formed between the first side edge and the center of the second opening, and the first back distance is larger than the first front distance.

4. The tablet according to claim 3, wherein a second front distance is formed between the center of the first opening and the second side edge, a second back distance is formed between the center of the second opening and the second side edge, and the second back distance is larger than the second front distance.

5. The tablet according to claim 1, wherein the tablet further includes a rubber ring fixed within the through hole, the rubber ring includes a non-slip through hole, and the rod holder is inserted through the non-slip through hole.

6. The tablet according to claim 1, wherein the tablet further includes a universal ball, the universal ball is multi-axially pivotable within the through hole, the universal ball includes a universal ball through hole, and the rod holder is inserted through the universal ball through hole to support the device body.

7. The tablet according to claim 6, wherein the through hole includes an annular recessed wall, and the universal ball is held by the annular recessed wall.

8. The tablet according to claim 1, wherein the device body is a tablet computer.

* * * * *